(12) United States Patent
Gess

(10) Patent No.: US 11,403,992 B2
(45) Date of Patent: Aug. 2, 2022

(54) MULTI POSITIONAL ATTACHABLE HANDLE WITH INTEGRATED BACKLIGHT ILLUMINATION <<BIAS>> SYSTEM

(71) Applicant: Daniel Neale Gess, Jordan, MN (US)

(72) Inventor: Daniel Neale Gess, Jordan, MN (US)

( * ) Notice: Subject to any disclaimer, the term of this patent is extended or adjusted under 35 U.S.C. 154(b) by 522 days.

(21) Appl. No.: 16/274,092

(22) Filed: Feb. 12, 2019

(65) Prior Publication Data
US 2020/0258445 A1 Aug. 13, 2020
US 2022/0130321 A9 Apr. 28, 2022

Related U.S. Application Data

(60) Provisional application No. 62/638,061, filed on Mar. 3, 2018.

(51) Int. Cl.
G09G 3/32 (2016.01)
F21V 23/00 (2015.01)
G06F 1/16 (2006.01)
H05B 45/10 (2020.01)

(52) U.S. Cl.
CPC ............. *G09G 3/32* (2013.01); *F21V 23/007* (2013.01); *G06F 1/1607* (2013.01); *H05B 45/10* (2020.01)

(58) Field of Classification Search
CPC ........ A45C 2011/001; A45C 2011/002; A45C 2011/003; A45C 2200/0516; A45C 2200/0525; H04M 1/02; H04M 1/04; G06F 1/1607; F21V 23/007; G09G 3/32; H05B 45/10; F16M 11/14

USPC .......... 315/291; 455/575.6; D14/253; 439/8; 403/90, 114, 122, 133; 248/181.1, 181.2
See application file for complete search history.

(56) References Cited

U.S. PATENT DOCUMENTS

| | | | | |
|---|---|---|---|---|
| D398,796 S | * | 9/1998 | Fauchald | D12/415 |
| 7,156,358 B2 | * | 1/2007 | March | F16M 13/02 403/90 |
| 7,438,491 B2 | * | 10/2008 | Fan | F16C 11/103 403/135 |
| 7,565,187 B1 | * | 7/2009 | Dynok | A45F 5/021 455/557 |
| 8,238,086 B2 | * | 8/2012 | Ou | F16M 11/2078 361/679.21 |
| 8,672,374 B1 | * | 3/2014 | Webber | F16M 13/00 294/25 |
| 8,706,175 B2 | * | 4/2014 | Cho | F16M 13/022 455/575.8 |
| D718,612 S | * | 12/2014 | McSweyn | D8/363 |
| 9,185,197 B2 | * | 11/2015 | Keesling | H04B 1/385 |
| 9,505,355 B1 | * | 11/2016 | Cho | F16M 11/14 |

(Continued)

*Primary Examiner* — Joshua E Rodden
(74) *Attorney, Agent, or Firm* — Chen-Chi Lin

(57) ABSTRACT

A portable assembly includes a multi-positional attachable handle with a plurality of integrated light emitting diodes (LEDs) within a perimeter of a reflective angled side edge of the handle which produces a back-light illumination. A white light emitting device is attached directly to a back of a smart phone, an iPad or a laptop product. The handle also functions as a stand assembly for holding a hand-held portable electronic device or a smartphone in a multitude of positions or locations. A first section of the device includes a pivot ball base that is attached to the back of the electronic device itself or it's case. A method of radiating light from behind an object during a darkened or low light viewing environment is called "Bias Lighting".

18 Claims, 5 Drawing Sheets

(56) References Cited

U.S. PATENT DOCUMENTS

| | | | | |
|---|---|---|---|---|
| D778,713 S * | 2/2017 | McSweyn | | D8/363 |
| 9,772,066 B2 * | 9/2017 | Tseng | | F16M 11/14 |
| 9,773,601 B2 * | 9/2017 | Breiwa | | F16M 11/2078 |
| 9,991,581 B2 * | 6/2018 | Taptic | | H04M 1/04 |
| D825,545 S * | 8/2018 | McSweyn | | D14/253 |
| 10,113,688 B2 * | 10/2018 | Zhu | | F16M 13/02 |
| 10,244,854 B1 * | 4/2019 | Haber | | A45F 5/10 |
| 10,694,835 B2 * | 6/2020 | Peterson | | A45C 11/00 |
| D893,415 S * | 8/2020 | McSweyn | | D13/108 |
| 10,750,844 B2 * | 8/2020 | Peterson | | A45C 11/00 |
| 2012/0068043 A1 * | 3/2012 | Daigle | | G06F 1/1628 |
| | | | | 248/682 |
| 2012/0075799 A1 * | 3/2012 | Pollex | | G06F 1/1628 |
| | | | | 361/679.56 |
| 2012/0118770 A1 * | 5/2012 | Valls | | F16M 13/00 |
| | | | | 248/688 |
| 2013/0112723 A1 * | 5/2013 | Harter | | B60R 11/02 |
| | | | | 224/274 |
| 2015/0195392 A1 * | 7/2015 | Nissenbaum | | A45F 5/00 |
| | | | | 455/569.1 |
| 2015/0382489 A1 * | 12/2015 | Sorensen | | F16M 13/022 |
| | | | | 248/558 |
| 2016/0036478 A1 * | 2/2016 | Wong | | H04B 1/3883 |
| | | | | 455/573 |
| 2017/0035172 A1 * | 2/2017 | Kim | | H04B 1/3888 |
| 2018/0159369 A1 * | 6/2018 | McSweyn | | H01F 7/0252 |
| 2018/0288204 A1 * | 10/2018 | Nahum | | H04M 1/04 |
| 2019/0089822 A1 * | 3/2019 | Gartz | | F16M 11/105 |
| 2020/0329133 A1 * | 10/2020 | Surani | | A45C 11/00 |

* cited by examiner

MULTI POSITIONAL ATTACHABLE HANDLE WITH INTEGRATED BACKLIGHT ILLUMINATION <<BIAS>> SYSTEM

RELATED U.S. APPLICATION DATA

This application claims an invention which was disclosed in Provisional Application No. 62/638,061, filed Mar. 3, 2018 entitled "Multi positional attachable handle with integrated back-light illumination <<bias>> system". The benefit under 35 USC § 119(e) of the United States provisional application is hereby claimed, and the aforementioned application is hereby incorporated herein by reference.

Field of Classification Search
USPC ... 362/109; 362/11; 362/3; 362/382; 362/249.02; 362/249.05; 362/230; 362/8; 362/458
See Application file for complete search history.

References Cited

U.S. Patent Documents

| | | |
|---|---|---|
| 9,765,921 B2 | September 2017 | Vogel et al. |
| 9,599,292 B2 | March 2017 | Jagt et al. |
| 9,535,285 B2 | January 2017 | Zhang et al. |
| 9,411,088 B2 | August 2016 | Krijn et al. |
| 9,086,610 B2 | July 2015 | Shoemake et al. |
| 8,840,274 B1 | September 2014 | Adams et al. |
| 8,485,683 B2 | July 2013 | Popper et al |
| 8,428,644 B1 | April 2013 | Harooni |
| 8,152,327 B2 | April 2012 | Brands et al. |
| D647085 | October 2011 | Chung et al. |
| 8,022,977 B2 | September 2011 | Kanade |
| 7,969,505 B2 | June 2011 | Saito |
| 7,914,169 B2 | March 2011 | Hesse et al. |
| 7,893,953 B2 | February 2011 | Krestakos et al. |
| 7,841,729 B2 | November 2010 | Geddes |
| 7,782,610 | August 2010 | Diebel et al. |
| 7664,865 B2 | February 2010 | Parikh et al. |
| 7644,895 | January 2010 | Tseng |
| 7631,979 B1 | December 2009 | Brown et al. |
| 7559,664 B1 | July 2009 | Walleman et al. |
| 7534,013 | May 2009 | Simon |
| 7422,353 B2 | September 2008 | Tenmy |
| D570,593 | June 2008 | Justiss |
| 7,270,255 B2 | September 2007 | Bladillo et al. |
| 7,127,163 B2 | October 2006 | Lee et al. |
| 7,110,802 B1 | September 2006 | Kim et al. |
| 7,098,813 B1 | August 2006 | Hung et al. |
| 6,729,518 B2 | May 2004 | Badillo et al. |
| 6,666,567 | December 2003 | Feldman et al. |
| 6,647,199 | November 2003 | Pelka et al. |
| 6,608,996 | August 2003 | Lauirikka at al. |
| 6,598,987 | July 2003 | Parrikka |
| 6,550,655 B2 | April 2003 | Warner |
| 6,536,914 | March 2003 | Hoelen et al. |
| 6,435,690 | August 2002 | Till |
| 6,325,524 | December 2001 | Weber et al. |
| 6,265,984 B1 | July 2001 | Molinaroli |
| 6,030,088 A | February 2000 | Scheinberg |
| 6,007,209 | December 1999 | Pelka |
| 5,859,481 A | January 1999 | Banyas |
| 5,775,791 | July 1998 | Yoshikawa et al |
| 5,568,549 | October 1996 | Wang |
| 5,512,880 A | April 1996 | Abrams et al. |
| 5,426,825 A | June 1995 | Soren et al. |
| 5,385,282 | January 1995 | Chen |
| 5,237,607 A | August 1993 | Diamantis |
| 5,210,532 A | May 1993 | Knoedler et al. |
| 5,087,906 A | February 1992 | Eaton et al. |
| 4,953,205 A | August 1990 | Yang |
| 3,604,913 A | September 1971 | Crete |
| 2003/0081411 A1 | May 2003 | Noda et al. |
| 2004/0080938 | April 2004 | Holman et al. |
| 2004/0253976 | December 2004 | Lin |
| 2005/0001537 | January 2005 | West et al. |
| 2005/0253923 A1 | November 2005 | Korn on et al. |
| 2006/0007666 A1 | January 2006 | Cook |
| 2007/0121343 A1 | May 2007 | Brown |
| 2007/0099681 A1 | May 2007 | Kielland |
| 2007/0139515 A1 | June 2007 | Du Breuil |
| 2007/0139798 A1 | June 2007 | Epstein |
| 2007/0164036 | July 2007 | Brandenburg |
| 2008/0053770 | March 2008 | Tynyk |
| 2008/0090443 | April 2008 | Ackloo |
| 2008/0123287 | May 2008 | Rossell et at. |
| 2009/0027874 | January 2009 | Chang |
| 2009/0174759 A1 | July 2009 | Yeh et al. |
| 2010/0321467 A1 | December 2010 | Goodman |
| 2011/0084081 A1 | April 2011 | Chung et al. |
| 2011/0195753 A1 | August 2011 | Mock et al. |
| 2011/0228096 A1 | September 2011 | Friel et al. |
| 2008/0122821 A1 | September 2011 | Nilsson et al. |
| 2012/0075799 A1 | March 2012 | Pollex |
| 2012/0068043 A1 | March 2012 | Daigle et al. |
| 2012/0118770 A1 | May 2012 | Valls etal. |
| 2012/0302294 A1 | November 2012 | Hammond et al. |
| 2013/0140837 A1 | June 2013 | Carroll |
| 2013/0208481 A1 | August 2013 | Sooferian |
| 2014/0022779 A1 | January 2014 | Su et al. |
| 2014/0055978 A1 | February 2014 | Gantz et al. |
| 2014/0179375 | June 2014 | Yang et al. |
| 2015/0207963 | July 2015 | Sayag |
| 2015/0263775 | September 2015 | Vila |
| 2015/0354793 | December 2015 | Young et al. |
| 2015/0354793 | December 2015 | Huang |
| 2015/03555525 | December 2015 | Abrams |
| 2015/0050965 | February 2016 | Perry |
| 2016/0082893 A1 | March 2016 | Ormsbee et al. |

DETAILED DESCRIPTION OF THE INVENTION

A handle (76) and pivot ball base assembly (86) for holding a hand-held portable electronic device aka smartphone, (121) I-pads or laptops in a multitude of positions or locations. The first section consisting of a pivot ball base (86) fastens to the back of the electronic device using a self adhesive pad (81). The second part is an elongated oval handle (76) that snaps onto a high frictionous pivot ball base (86) which allows handle to be rotated in any 360 degree position. A tightening nut (91) rides over the pivot ball and when tightened firmly secures the handle to the base at any degree or angle preferred by user. Handle (76) can be released or unsnapped from the pivot ball base (86) to release invention from the electronic device. Assembly allows user to firmly grip the handle or place handle between fingers in any desired ergonomically fashion to comfortably and securely hold the electronic device (121) from falling while talking, photo-video-graphing, gaming, calling, texting and etc. Assembly also allows user to securely hold device easily with one hand or a combination of several fingers.

The invention also has an integrated electroluminescent system (96) that diffuses white light from the elongated oval handle around the back perimeter of the electronic device to the front screen viewing area. The illuminating light source maybe a plurality light panel of LED's (96) built in the angular side with a reflective edge (106) of the handle (76). The electroluminescent lighting source may derive its power from rechargeable batteries (116) located inside the handle. Handle incorporates an on/off dimmer switch (111) and a lighting cable port (101) for recharging the batteries independently from the electronic device. The method of radiating light from behind an object during a darkened viewing environment is called bias lighting.

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

1. Field of the Invention

The present invention relates generally to the illumination of an object from the rear or backside of the object and more specifically it relates to the much improved visual optics or viewing enhancement of such object when this lighting act is performed. This unique lighting method of illuminating an object from the rear is called bias lighting and is used while an object is located in inadequately low light or darkened environment.

2. Review And Description of the Related Art

Any discussion of the prior art throughout the specification should in no way be considered as an admission that such prior art is widely known or forms part of common general knowledge in the field.

Smart phone and other mobile handheld devices have been around mainly for consumers during the last two decades. Subsequently there has only been a very limited practice of using bias lighting in the consumer electronic industry as a whole. Currently the only consumer electronic market sector applying this distinctive lighting procedure is the aftermarket television home theater segment. While numerous attachable accessories exist for holding or clamping a portable electronic device, none are designed with a rear electroluminescent lighting feature specifically designed to emit and diffuse white light from the back device to the front screen viewing area.

(Related Art—"Handle Section")

For example U.S. Pat. No. 8,560,031 to Barnett et al., U.S. Pat. No. 7,644,895 to Tseng, U.S. Pat. No. 9,765,921 to Vogel et al., U.S. Pat. No. 5,568,549 to Wang, U.S. Pat. No. 8,616,422 to Adelman et al., U.S. Pat. No. 7,782,610 to Diebel at al.

Barnett discloses (U.S. Pat. No. 8,560,031) an accordion type of holding grip that attach to a mobile phone or its case that can either extend or retract. This suction type grip or knob when extended can also serve as a propping stand apparatus or accommodates the users headset cords which can simply be wound around them for safe keeping.

Tseng discloses (U.S. Pat. No. 7,644,895) a clamping device for an electronic product consisting of a combining member and a base and an outer periphery whereas earphone cables can be wound around. This device can attach to a girdle or waist belt making the device convenient and within an arms reach.

Vogel discloses (U.S. Pat. No. 9,765,921) a magnetic stand assembly for holding various handheld touchscreen electronic devices in a multitude of positions and locations. The device consists of two parts the first section is comprised of a first end shaped to rest stably on a flat surface and a second section consisting of a round adjustable sphere that can be adjusted by rotation this curved section and is constructed of a magnetic material. The second section is further comprised of either being made from or including a magnet to attract magnetic material backing of the electronic device which holds the device into position.

Wang discloses (U.S. Pat. No. 5,568,549) a mobile telephone holder comprising of a mounting base having vacuum mounts for fastening to an automobile window glass or a flat surface, a holder frame for holding a mobile telephone, and a supporting arm connected between the mounting base and the holder frame, the supporting arm consists of a flexible accordion type of bellow sleeved protruding arm that is attached to suction mounted mounting base and the holder frame.

Adelman discloses (U.S. Pat. No. 8,616,422) a case for holding an electronic device includes a body having a void for holding the electronic device. The void approximately replicates the shape of the electronic device such that a face of the electronic device is not substantially surrounded by the body. The body has tabs configured to contact a portion of the face of the electronic device and hold the electronic device in the void such that it is held in place. The body has a flexible body portion, the flexible body portion defined by a cut in the body, dividing the body into a hinge portion and a main body. The hinge portion is configured to be pivoted away from the main body to provide a direction that the electronic device is slide from body of the case.

Diebel discloses (U.S. Pat. No. 7,782,610) a case for an electronic device which protects and extends the battery life of the electronic device. The case has a lower case portion and an upper case portion, which assembled together protect the top, side, and bottom edges of the electronic device. The lower case portion includes a battery to extend the battery life usage of the electronic device. The lower case portion comprises at least four light emitting diodes coupled to the case battery circuitry, wherein the light emitting diodes indicate the users different selected charging modes and the total strength status of the two combined batteries.

(Related Art—"Lighting Section")

For example U.S. Pat. Nos. 9,086,610 and 9,464,796 to Shoemake et al., U.S. Pat. No. 9,442,346 to Gantz et al., U.S. Pat. No. 8,428,644 to Harooni, U.S. Pat. No. 8,840,274 to Adams et al., U.S. Pat. No. 6,435,690 to Till.

Shoemake discloses in (U.S. Pat. Nos. 9,086,610 and 9,464,796) which have the effectively identical claims stemming from the same provisional application No. 61/594,653 filed on Feb. 3, 2012. Both inventions disclose an illumination lighting device that may be attached to a computing device and provide a light source for a video call, video conference, or a picture capturing process. The illumination device comprises a light source placed in the front side of the case that holds the handheld device. The illumination device may also serve as indicators or signals for gaming purposes, special alerts, incoming calls or ongoing calls all by displaying different light intensity, flashes, pattern, or color or a combination thereof. The main exclusive feature of both inventions is provide direct lighting from the front of the handheld electronic device which can occasionally improve the image quality for taking self portraits or videoing oneself which is universally known as a "Selfie". According to inventor; poor lighting is one of the primary reasons for the poor appearance of facial images that are viewed online from digital picture and/or digital videography. Without this direct front lighting said individual does not appear as attractive as they otherwise would in person. Therefore this front projected "proper" lighting invention ensures an aesthetically pleasing appearance of an individual's face.

Gantz discloses in (U.S. Pat. No. 9,442,346) a case for a portable electronic device that includes a rim portion defining an opening for a display of the portable electronic device and one or more light modules adjacent to the rim portion. This lighting device may include one or more light sources for illuminating a user's face during use of a camera of a portable electronic device, and a power member for providing power to the one or more light sources. The lighting device can enable a user to provide light while taking a picture or video using the front-facing camera of the portable electronic device. A lighting module may include a plurality of lighting devices. A power module having a battery may be configured to provide power to a portable electronic device. Another aspect of the invention is to provide a light source for illuminating objects thereby enhancing picture image quality to an object to be captured by said camera feature.

Harooni discloses in (U.S. Pat. No. 8,428,644) an invention that describes a protective mobile phone device case that provides a LED lighting solution integrated with the case. The LED lighting solution can be utilized with the functions of the mobile phone device to provide additional illumination for photography and videography purposes as well as to provide ornamental or decorative enhancements to the device. The device case has an integrated ring of Light Emitting Diode (LED) lights in the case and to provide an illumination to be used in conjunction with functionality native to the phone device; the base part embedded electronic circuitry in the case with a portable power source that provides the ability to illuminate the LEDs simultaneously or selectively; the ring of LED lights are mounted in a recessed manner in the case, with each LED light being covered by a lens to provide for diffusion of the illumination; the LED's are embedded in the case; further, the LED light ring illuminated to provide a diffused light source to be used in conjunction with professional photography and/or videography. The LED light ring can be individually turned on or off or lit in sequence. The LED light ring can be provided in either a standard white light configuration or a tri-color configuration. In these different embodiments, the Integrated Lighting Accessory and Case for a Mobile Phone Device invention can light up the LEDs for a variety of different applications. Some examples could be to light alternating LED lights in sequence or to light each LED light in the ring one at a time in rotating fashion to provide for different illuminating patterns either when desired by a user or associated with incoming calls on the phone device. Alternatively, in the configuration where tri-color LED's are used, different color illuminations could be utilized to present different callers, or different types of incoming callers on the phone device.

Adams discloses in (U.S. Pat. No. 8,840,274) an electronics package includes an electronic component having a light emitting diode (LED) and a protective case encapsulating the electronic component. An optical system is arranged between the electronic component and the protective case. The optical system is maneuvered to one of multiple positions via an actuator that is coupled to the optical system, where the actuator is accessible external to the protective case by the user of the electronics package. A first position of the optical system allows the light generated by the LED to be collected and/or controlled by the optical system. A second position of the optical system allows the light generated by the LED to be unaffected by the optical system. A third position of the optical system allows a portion of the light generated by the LED to be collected and/or controlled by the optical system and the remaining portion to be unaffected. An electronics package, comprising: an electronic component having an LED, wherein the electronic component is an electronic tablet; and a case encapsulating the electronic component, the case including, an optical system disposed between the electronic component and the case; and an actuator coupled to the optical system, wherein the optical system is maneuvered to first and second positions via the actuator, the first position being more proximate to the LED as compared to the second position.

Till discloses in (U.S. Pat. No. 6,435,690) a perimeter lighting systems for portable communication devices such as two-way radios and cell phones. Invention includes a light distribution channel which is configured to capture light emitted by a device and directs it around perimeter portions of the device to allow for easier locating means in dark or low light conditions such as purses, briefcases, dark recessed and small areas or corners of cars and houses, as well as the outdoors. The perimeter lighting system can be integrated into the housing of the device or can be provided as an after market case or belt clip. The present invention can facilitate improved visual location of portable devices without requiring additional large power requirements from the device itself (thereby preserving the operating life of the device between charges).

The perimeter lighting systems of the present invention can allow a user to more easily locate small devices in dark or low light conditions. The perimeter lighting system can be embedded in an "after-market" case or can be integrated into the housing of the device itself.

BRIEF SUMMARY OF THE INVENTION

The general purpose of the present invention is to couple with an electronic device; a back-lighting/bias lighting apparatus using (LED's) integrated into a handle in which to grasp a hand held portable electronic device such as a smart phone, I pad or laptop product. By comparison light emitting diodes (LED's) have been utilized since about the 1960's. However, for the first few decades of use, the relatively low light output and short life span of LED's severely limited range of this newly discovered specialized lighting source. As the LED light output and other characteristics significantly improved, LED utilization began to increase. Over the last several years, the white light output capacity of LED's has more than tripled, thereby allowing the LED to become the lighting solution of choice for a wide range of lighting solutions. In view of the foregoing, the inventor has integrated a lighting apparatus into a handle which is attached to the backside of a mobile electronic device described in this application. Invention emits a subtle diffused white back-light around the perimeter of the electronic device thereby increasing the ambient light around the screen without shining more light into the viewer's eyes, this simple but routinely misunderstood technique yields a much safer and superior view by increasing the perceived screen image clarity of the device screen, furthermore reducing eye fatigue amongst other related health ailments associated with viewing illuminated electronic screens in darkened environments. Thereby watching an electronic device screen in a low light or dark environment bias lighting can substantially help reduce the eye strain caused by long exposures to phone, Ipad screens and other electronic device viewing monitors.

A. Thereby the predominant embodiment of the present invention is the implementation of the distinctive backlighting/bias lighting hallmark as described throughout this patent application.

B. The secondary embodiment is the elongated ergonomic handle designed to be griped by either hand, a combination of several fingers, used as a device support stand to prop device on a horizontal surface, or as a hook or clip when attaching the portable electrical device to a vertical surface.

BRIEF DESCRIPTION OF THE DRAWING (S)

Various other objects, features and attendant advantages of the present invention will become fully appreciated as the same becomes better understood when considered in conjunction with the accompanying drawings, in which like reference characters designate the same or similar parts throughout the various views. Overview: Turning now descriptively to the drawings, in which similar reference characters denote similar but independent elements throughout the following illustrated views in FIG. 1 through FIG. 8.

Figure 1:
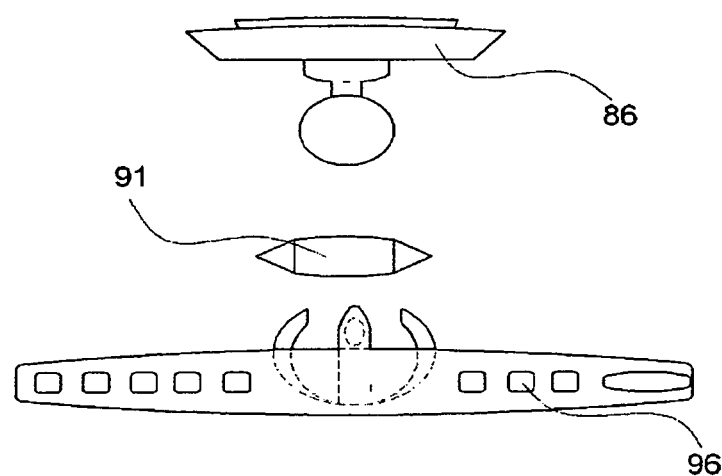
FIG. 1 illustrates the section consisting of a pivot ball base mount adhered to the back of the electronic device. The elongated oval handle that snaps onto a highly frictionous pivot ball base which allows handle to be rotated in any 360 degree position.
Figure 2:
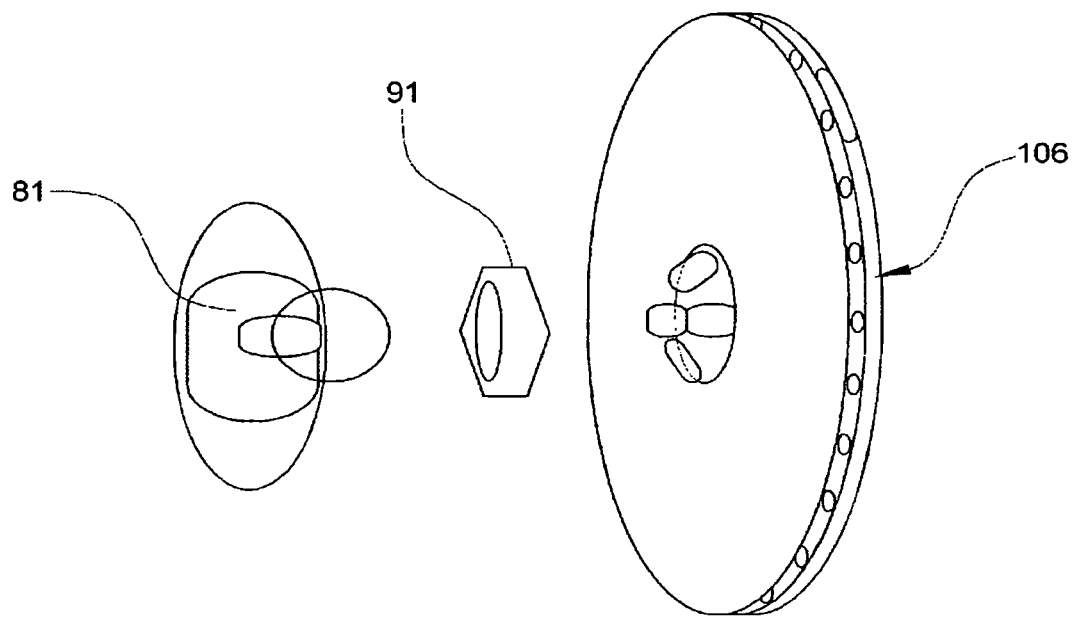
FIG. 2 illustrates a tightening nut which rides over the pivot ball and when tightened firmly secures the handle to the base at any degree or angle preferred by user.
Figure 3:
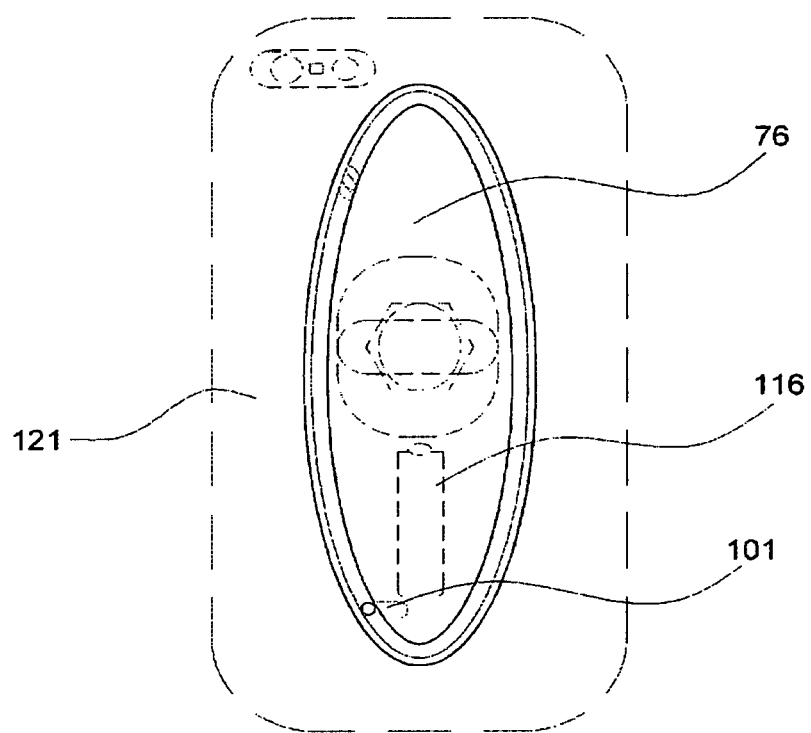

FIG. 3 illustrates the handle which can be released or unsnapped from the pivot ball base to release invention from the electronic device. Assembly allows user to firmly grip the handle or place handle between fingers in any desired ergonomically fashion to comfortably and securely hold the electronic device from falling while talking, photo-video graphing gaming, calling, texting and etc. Assembly also allows user to securely hold device easily with one hand or several fingers.

Figure 4:
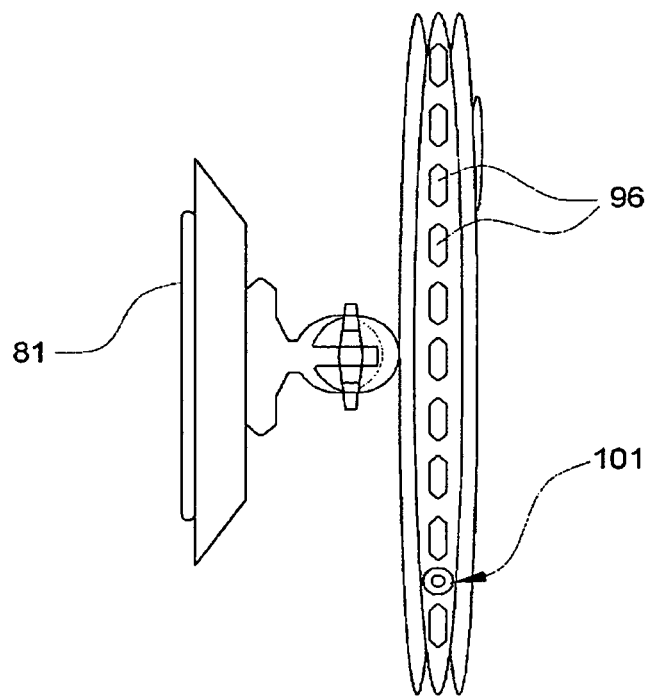

FIG. 4 illustrates the integrated LED plurality modules aka the electroluminescent system that diffuses white light from the elongated oval handle around the back perimeter of the electronic device to the front screen viewing area.

Figure 5:
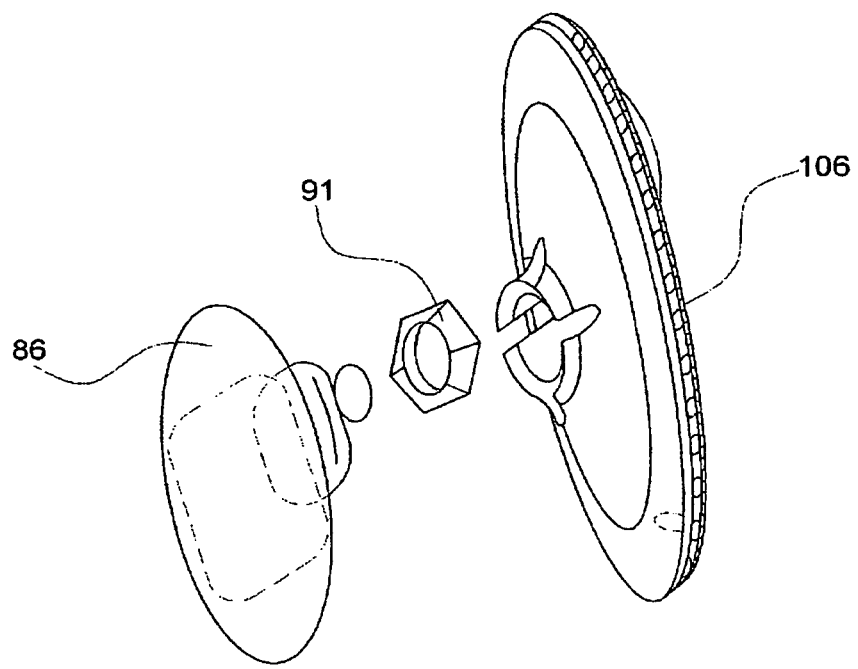

FIG. 5 illustrates the angular side with a reflective edge of the handle which enhances the illuminating light diffusion of plurality of LED's modules.

Figure 6:
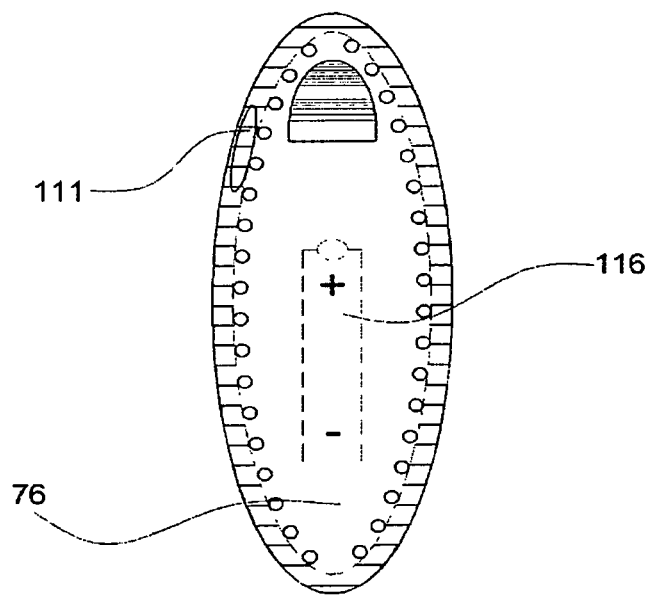

FIG. 6 illustrates the electroluminescent lighting source may derive its power from rechargeable the battery(s) located inside the handle.

Figure 7:
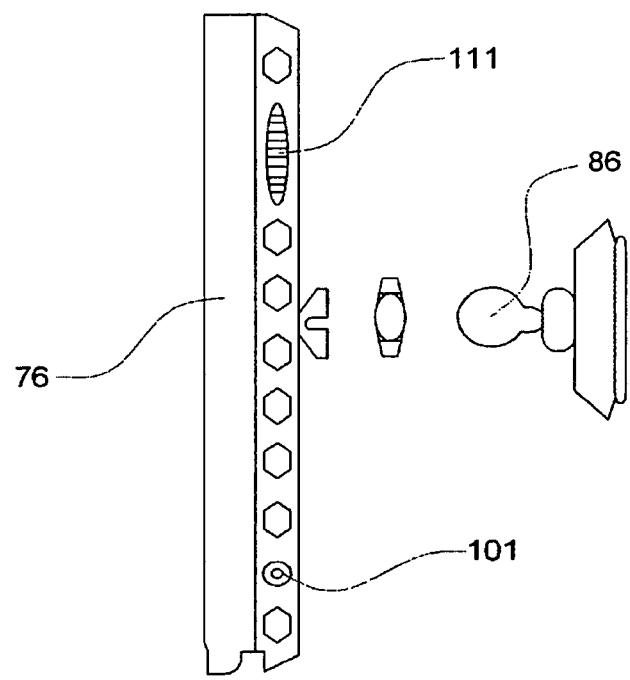

FIG. 7 illustrates handle that incorporates an on/off dimmer switch and a lighting cable port for recharging he battery(s) independently of the electronic device.

Figure 8:
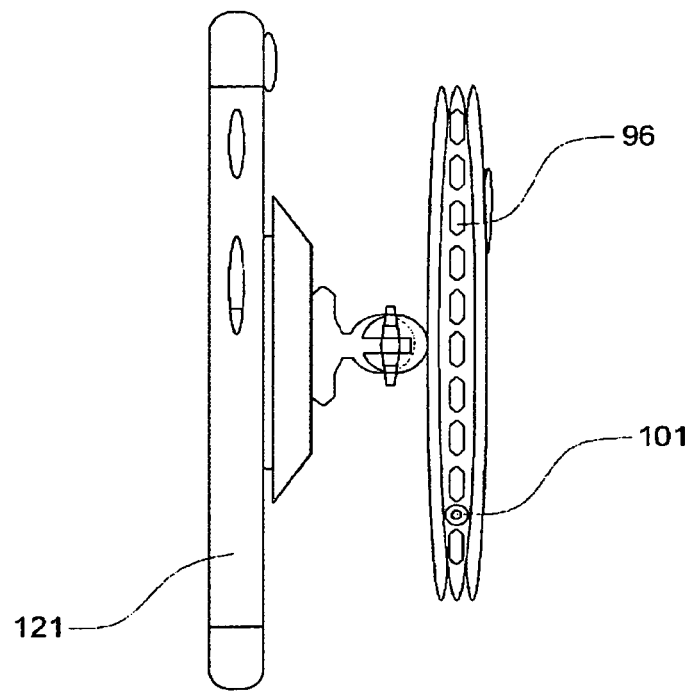

FIG. 8 illustrates the charging port for recharging the battery(s) or used as a port to connect directly to electronic device for auxiliary power for the bias lighting apparatus.

Figure 9:
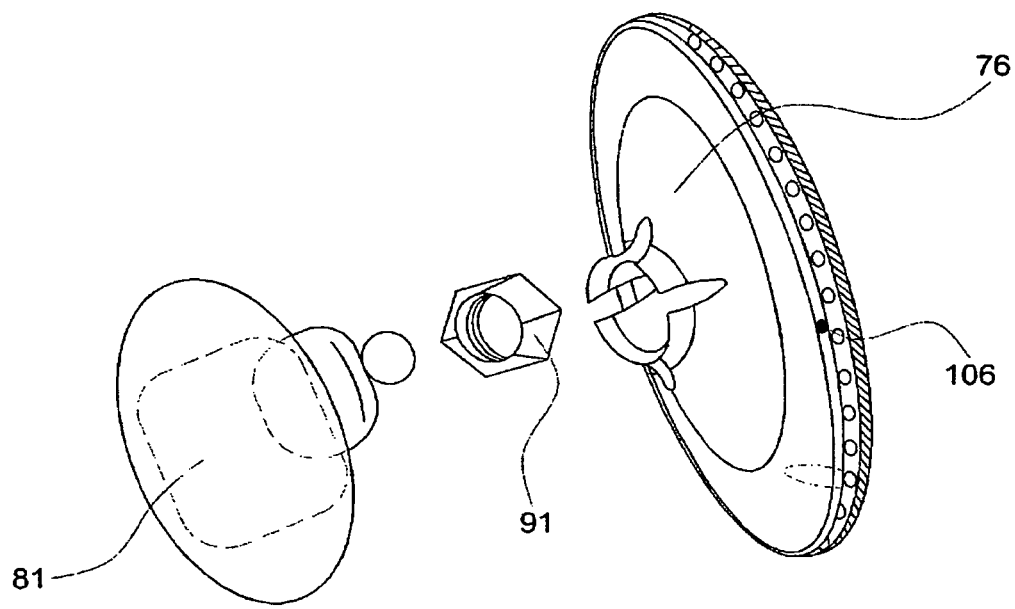

FIG. 9 illustrates the self adhesive pad that is used to attached the pivot ball base of the Bias Bar apparatus to the back of the smart phone and/or other similar electronic device.

Figure 10:
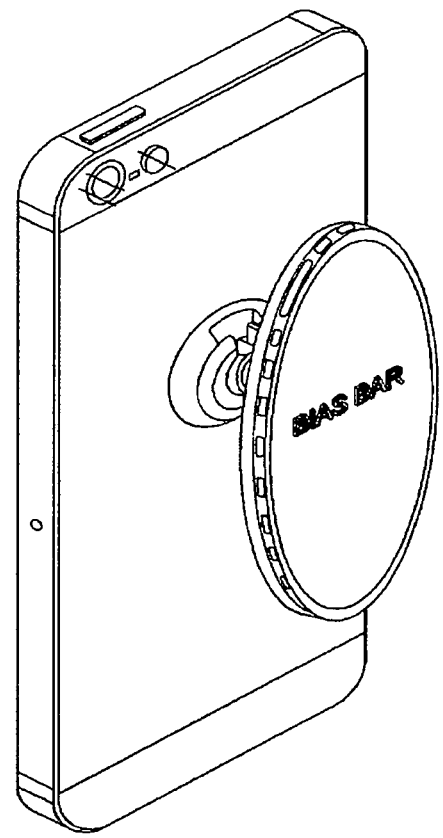

FIG. 10 illustrates a 3-D drawing of the comprehensive invention attached to the back of a smart phone device.

ADVANTAGES OF THE INVENTION COMPARED TO PRIOR ART

In view of the foregoing disadvantages inherent in the all other known types of handheld electronic device attachments, inventor claims that not only does this current invention provide an ergonomic handle for such devices, invention brilliantly incorporates a configuration that results in health benefits whereby diffusing a subtle white backlight aka bias lighting to the device s front screen thereby reducing eye fatigue and increasing perceived image clarity. Watching a smartphone screen in a dark environment, both eyes stare intently at a small window of very bright light that is floating in the sea of darkness around the screen. Both eyes accurately perceive the screen to be very bright in relationship to the rest of the environment. This invention corrects this unbalanced and unnatural human characteristic.

Using a hand held device aka smartphone, i-pad or computer laptop in the darkness; the sudden drop in luminescence from the screen to the surrounding darkness creates a sharp contrast that human eyes strain to manage. However, your eyes don't adjust to the average level of brightness displayed onscreen. Instead, they adjust to the average brightness across your entire field of view. This actually causes two problems. First, you're not seeing as clear a contrast on screen if the rest of environment is dark. Your eyes will perceive richer darker areas if the surrounding field of vision is not as dark. The most important thing to understand is that your eyes work on a system of averages. When you look at something, whether that something is a car headlights in the distance, a pretty landscape, or a smart phone screen, pupils dilate to regulate how much light enters your eyes. the degree of dilation is triggered by the average amount of light your eyes take in from that entire scene—not by the single brightest point of light within that scene. Your eyes constantly work to find the perfect balance between light and dark.

Pupils constrict and dilate to control how much light reaches your retinas, and how much they dilate depends on your entire field of view. So, when all you see are constantly changing levels of brightness surrounded by darkness, your eyes can become overworked as they try to adjust. This can result in dryness of the eyes, tiredness, headaches, and ocular migraines. Adding device screen back-lighting can help establish a sort of baseline so that your eyes don't have to adjust so dramatically. Although any type of light may help alleviate the strain on your eyes while looking at a screen, there is a right and wrong type of location for the light to have the optimum effect. As mentioned earlier, bias lighting is placed behind the device screen to establish a brighter field of view so that your eyes aren't constantly trying to find a balance between light and dark. Bias lighting illuminates your specific viewing area without creating a glare or reflections on your screen, shining directly in your eyes or affecting how you see contrast and color.

The second benefit is what gives it the name "Bias Lighting". The color of the light is used behind the screen display changes how your brain interprets the colors from the display itself, i.e. your bias or your brain's color interpretation. If you shine an orange light behind the monitor, you perceive everything on-screen as slightly more orange. Same with every bias color, including white. Most importantly white light can actually assist your brain to perceive more accurate colors, which is beneficial to anyone who does creative work where accuracy is a necessity. Bias lighting can reduce the eye strain caused by long exposures to hand-held personal device screens in darkened environment, but it can also help make grays and blacks on your screen seem much more pronounced and richer.

PROPRIETARY ASPECT

What is claimed is:
  A. Invention has a back-light "bias lighting" apparatus incorporated into the elongated handle which diffuses white light in a constant and evenly manner around the back side perimeter of the portable hand held electronic device to the screen viewing front side of device allowing the emitted diffused light to altogether illuminate the two-dimensional surface perimeter area of the front screen of the portable electronic device.

INCORPORATION BY REFERENCE

All publications, patents, and patent applications mentioned in this specification are herein incorporated by reference to the same extent as if each individual publication, patent, or patent application was specifically and individually indicated to be incorporated by reference.

APPLICATION DISCLOSURE

Accordingly, various devices are known in the art. However, their structure and means of operation are substantially different from the present disclosure. The other inventions also fail to solve all the problems taught by the present disclosure. At least one embodiment of this invention is presented in the drawings below and will be described in more detail herein.

Although this invention has been described with a certain degree of particularity, it is to be understood that the present disclosure has been made only by way of illustration and that numerous changes in the details of construction and arrangement of parts may be resorted to without departing from the spirit and the scope of the invention. To overcome limitations in the prior art, and to overcome other limitations that will become apparent upon reading and understanding the present specification, author has enclosed various embodiments within this utility patent application.

Furthermore it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

DRAWINGS

Five pages of drawings represented by FIGS. 1 thru 10 are submitted with this utility patent application. Additionally three separate pages of drawings are also submitted which were included with the provisional application No. 62/638,061 filed Mar. 3, 2018.

CONCLUSION

In conclusion; no other Prior Art claims were found to exist to date that clearly implement a back-lighting/bias lighting apparatus that incorporates or implements such a specific lighting method in the framework of their gadgetry description.

What is claimed is an apparatus consisting of:
1. An apparatus for holding a hand-held portable electronic device in a multitude of positions, the apparatus comprising:
  a stand assembly configured to be attached to the hand-held portable electronic device, the stand assembly comprising:
    a pivot ball mounting base;
  a handle comprising:
    an engagement assembly configured to be snapped onto the pivot ball mounting base of the stand assembly; and
    a lighting assembly comprising:
      a plurality of light emitting diodes; and
    a tightening nut being characterized by
      a loose condition in which the handle is rotatable; and
      a tightened condition in which the handle is stationary relative to the pivot ball mounting base.
2. The apparatus of claim 1, wherein the handle further comprises a rechargeable battery supplying power to the plurality of light emitting diodes; and wherein the apparatus further comprises a charging cord supplying power to the plurality of light emitting diodes.
3. The apparatus of claim 1, wherein a bias lighting method is applied so that a front side of the hand-held portable electronic device is illuminated by light from the plurality of light emitting diodes positioned on a back side of the hand-held portable electronic device.
4. The apparatus of claim 1, wherein a housing of the handle, the pivot ball mounting base, and the tightening nut are made of a polyester-based thermoplastic polyurethane elastomer.
5. The apparatus of claim 1, wherein a rim of a housing of the handle is coated with a reflective material.
6. The apparatus of claim 1, wherein the handle further comprises a dimmer control switch controlling the plurality of light emitting diodes.
7. The apparatus of claim 1, wherein the stand assembly is permanently attached to the hand-held portable electronic device by an adhesive.
8. The apparatus of claim 1, wherein each of the plurality of light emitting diodes comprises a respective rectangular lighting module with integrated electronic circuitry.
9. The apparatus of claim 1, wherein a housing of the handle is of an oval shape.
10. An apparatus for holding a hand-held portable electronic device, the apparatus comprising:
  a stand assembly comprising:
    a pivot ball mounting base;
  a handle comprising:
    an engagement assembly configured to be snapped onto the pivot ball mounting base of the stand assembly; and
    a tightening nut being characterized by
      a loose condition in which the handle is rotatable; and
      a tightened condition in which
        the engagement assembly of the handle is stationary relative to the pivot ball mounting base;
  wherein the handle further comprises a lighting assembly comprising a plurality of light emitting diodes.
11. The apparatus of claim 10, wherein the stand assembly further comprises an adhesive pad attached to a bottom surface of the stand assembly; and wherein the apparatus is attached to the hand-held portable electronic device by the adhesive pad.
12. The apparatus of claim 10, wherein the tightening nut is characterized by the tightened condition in which an inner surface of the tightening nut directly contacts an outer surface of the engagement assembly of the handle.

13. The apparatus of claim 12, wherein the engagement assembly comprises four prongs.

14. The apparatus of claim 10, wherein the plurality of light emitting diodes are disposed on a side surface of a housing of the handle.

15. The apparatus of claim 10, wherein the handle further comprises a rechargeable battery supplying power to the plurality of light emitting diodes.

16. The apparatus of claim 10, wherein a housing of the handle, the pivot ball mounting base, and the tightening nut are made of a polyester-based thermoplastic polyurethane elastomer.

17. The apparatus of claim 10,
wherein the handle further comprises a dimmer control switch controlling the plurality of light emitting diodes.

18. An apparatus for holding a hand-held portable electronic device, the apparatus comprising:
   a stand assembly comprising:
      a pivot ball mounting base;
   a handle comprising:
      an engagement assembly configured to be snapped onto the pivot ball mounting base of the stand assembly; and
   a tightening nut being characterized by
      a loose condition in which the handle is rotatable; and
      a tightened condition in which
         the engagement assembly of the handle is stationary relative to the pivot ball mounting base;
wherein a rim of a housing of the handle is coated with a reflective material.

\* \* \* \* \*